(12) United States Patent
Paczkowski et al.

(10) Patent No.: US 9,208,339 B1
(45) Date of Patent: Dec. 8, 2015

(54) VERIFYING APPLICATIONS IN VIRTUAL ENVIRONMENTS USING A TRUSTED SECURITY ZONE

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew Carl Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 135 days.

(21) Appl. No.: 13/964,112

(22) Filed: Aug. 12, 2013

(51) Int. Cl.
G06F 9/00 (2006.01)
G06F 21/62 (2013.01)
G06F 21/72 (2013.01)

(52) U.S. Cl.
CPC .......... G06F 21/6218 (2013.01); G06F 21/725 (2013.01)

(58) Field of Classification Search
CPC ............ G06F 21/30; G06F 2221/2103; G06F 21/725; H04L 63/12
USPC .......................................................... 726/30
See application file for complete search history.

(56) References Cited

U.S. PATENT DOCUMENTS

| 5,303,378 | A | 4/1994 | Cohen |
| 5,321,735 | A | 6/1994 | Breeden et al. |
| 5,764,889 | A | 6/1998 | Ault et al. |
| 5,796,952 | A | 8/1998 | Davis et al. |
| 6,131,024 | A | 10/2000 | Boltz |
| 6,177,860 | B1 | 1/2001 | Cromer et al. |
| 6,219,712 | B1 | 4/2001 | Mann et al. |
| 6,363,150 | B1 | 3/2002 | Bhagavath et al. |

(Continued)

FOREIGN PATENT DOCUMENTS

| WO | WO2011025433 A1 | 3/2011 |
| WO | WO2012064171 A1 | 5/2012 |

(Continued)

OTHER PUBLICATIONS

Notice of Allowance dated Dec. 22, 2014, U.S. Appl. No. 13/470,203, filed May 11, 2012.

(Continued)

*Primary Examiner* — Izunna Okeke
*Assistant Examiner* — Bryan Wright

(57) ABSTRACT

Systems and methods for transmitting information between virtual environments comprising: copying a first virtual environment, wherein the first virtual environment comprises a plurality of original applications, a first clock, and a first trusted security zone to create a second virtual environment, wherein the second virtual environment comprises a copy of at least some applications of the plurality of original applications, a second clock, and a second trusted security zone. The first trusted security zone may receive a request from a copied application to engage in a transmission with an original application. The first trusted security zone may then determine if a nonce associated with the copied application is a verified nonce, wherein determining if the nonce is a verified nonce comprises comparing, by the first trusted security zone, the nonce associated with the copied application to a nonce associated with the at least one original application.

18 Claims, 9 Drawing Sheets

(56) References Cited

U.S. PATENT DOCUMENTS

| | | |
|---|---|---|
| 6,477,180 B1 | 11/2002 | Aggarwal et al. |
| 6,507,904 B1 | 1/2003 | Ellison et al. |
| 6,614,893 B1 | 9/2003 | Paiz |
| 6,668,322 B1 | 12/2003 | Wood et al. |
| 6,691,230 B1 | 2/2004 | Bardon |
| 6,754,784 B1 | 6/2004 | North et al. |
| 6,823,454 B1 | 11/2004 | Hind et al. |
| 6,824,064 B2 | 11/2004 | Guthery et al. |
| 6,895,234 B1 | 5/2005 | Laursen et al. |
| 7,043,241 B1 | 5/2006 | Sladek et al. |
| 7,366,806 B2 | 4/2008 | Milenkovic et al. |
| 7,387,240 B2 | 6/2008 | Ziegler |
| 7,519,824 B1* | 4/2009 | Peyravian et al. ............ 713/178 |
| 7,552,467 B2 | 6/2009 | Lindsay |
| 7,571,364 B2 | 8/2009 | Whetsel |
| 7,650,645 B1 | 1/2010 | Langendorf et al. |
| 7,716,720 B1 | 5/2010 | Marek et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,588,749 B1 | 11/2013 | Sadhvani et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia et al. |
| 8,811,971 B2 | 8/2014 | Corda et al. |
| 8,831,998 B2 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 2001/0041591 A1 | 11/2001 | Carroll |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2005/0015601 A1 | 1/2005 | Tabi |
| 2005/0045719 A1 | 3/2005 | Yang |
| 2005/0052994 A1 | 3/2005 | Lee |
| 2005/0091505 A1 | 4/2005 | Riley et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0181796 A1 | 8/2005 | Kumar et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0272445 A1 | 12/2005 | Zellner |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0129488 A1* | 6/2006 | Vincent ............... 705/50 |
| 2006/0156026 A1 | 7/2006 | Utin |
| 2006/0164978 A1 | 7/2006 | Werner et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0118880 A1 | 5/2007 | Mauro |
| 2007/0143210 A1 | 6/2007 | Yeung et al. |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0005794 A1 | 1/2008 | Inoue et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0051142 A1 | 2/2008 | Calvet et al. |
| 2008/0092213 A1 | 4/2008 | Wei et al. |
| 2008/0097793 A1 | 4/2008 | Dicks et al. |
| 2008/0108321 A1 | 5/2008 | Taaghol et al. |
| 2008/0109662 A1 | 5/2008 | Natarajan et al. |

(56) References Cited

U.S. PATENT DOCUMENTS

| | | |
|---|---|---|
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0227290 A1 | 9/2009 | Chien |
| 2009/0248445 A1 | 10/2009 | Harnick |
| 2009/0271321 A1 | 10/2009 | Stafford |
| 2009/0281947 A1 | 11/2009 | Erel |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0082711 A1 | 4/2011 | Poeze et al. |
| 2011/0107426 A1 | 5/2011 | Yen et al. |
| 2011/0112968 A1 | 5/2011 | Floreck et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |

(56) References Cited

U.S. PATENT DOCUMENTS

| | | |
|---|---|---|
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1* | 5/2013 | Frascadore ............... 718/1 |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0262264 A1 | 10/2013 | Karstoft |
| 2013/0263212 A1 | 10/2013 | Faltyn et al. |
| 2013/0290709 A1 | 10/2013 | Muppidi et al. |
| 2013/0305333 A1 | 11/2013 | Katzer et al. |
| 2013/0310003 A1 | 11/2013 | Sadhvani Rita et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0033316 A1 | 1/2014 | Paczkowski et al. |
| 2014/0047548 A1 | 2/2014 | Bye et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0155025 A1 | 6/2014 | Parker et al. |
| 2014/0173747 A1 | 6/2014 | Govindaraju |
| 2014/0188738 A1 | 7/2014 | Huxham |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279558 A1 | 9/2014 | Kadi et al. |
| 2014/0281544 A1 | 9/2014 | Paczkowski et al. |
| 2014/0298026 A1 | 10/2014 | Isozaki et al. |
| 2015/0106805 A1 | 4/2015 | Melander et al. |
| 2015/0169885 A1 | 6/2015 | Paczkowski et al. |
| 2015/0172928 A1 | 6/2015 | Katzer et al. |

FOREIGN PATENT DOCUMENTS

| | | |
|---|---|---|
| WO | 2013170228 A2 | 11/2013 |
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Notice of Allowance dated Feb. 5, 2015, U.S. Appl. No. 13/533,969, filed Jun. 27, 2012.

Office Action dated Dec. 15, 2014, U.S. Appl. No. 13/571,348, filed Aug. 10, 2012.

Restriction Requirement dated Jan. 2, 2015, U.S. Appl. No. 13/762,319, filed Feb. 7, 2013.

FAIPP Pre-Interview Communication dated Feb. 12, 2015, U.S. Appl. No. 14/066,661, filed Oct. 29, 2013.

Notice of Allowance dated Dec. 3, 2014, U.S. Appl. No. 13/594,777, filed Aug. 25, 2012.

First Action Interview Office Action dated Dec. 3, 2014, U.S. Appl. No. 13/594,779, filed Aug. 25, 2012.

Notice of Allowance dated Feb. 26, 2015, U.S. Appl. No. 13/786,450, filed Mar. 5, 2013.

FAIPP Pre-Interview Communication dated Dec. 16, 2014, U.S. Appl. No. 13/898,435, filed May 20, 2013.

Notice of Allowance dated Feb. 20, 2015, U.S. Appl. No. 13/898,435, filed May 20, 2013.

Notice of Allowance dated Dec. 19, 2014, U.S. Appl. No. 13/844,325, filed Mar. 15, 2013.

Notice of Allowance dated Jan. 2, 2015, U.S. Appl. No. 13/831,463, filed Mar. 14, 2013.

FAIPP Pre-Interview Communication dated Feb. 4, 2015, U.S. Appl. No. 14/075,663, filed Nov. 8, 2013.

FAIPP Pre-Interview Communication dated Feb. 25, 2015, U.S. Appl. No. 14/163,047, filed Jan. 24, 2014.

Restriction Requirement dated Jan. 5, 2015, U.S. Appl. No. 13/857,139, filed Apr. 4, 2013.

Foreign Communication from a Related Counterpart—International Preliminary Report on Patentability, dated Jan. 8, 2015, PCT/US13/47729, filed on Jun. 25, 2013.

Foreign Communication from a Related Counterpart—International Preliminary Report on Patentability, dated Feb. 19, 2015, PCT/US13/53617, filed on Aug. 5, 2013.

Foreign Communication from a Related Counterpart—International Preliminary Report on Patentability, dated Feb. 5, 2015, PCT/US13/51750, filed on Jul. 24, 2013.

Katzer, Robin D., et al., "Web Server Bypass of Backend Process on Near Field Communications and Secure Elements Chips", filed Feb. 26, 2015, U.S. Appl. No. 14/632,850.

Neson, Tracy L., et al., "Mated Universal Serial Bus (USB) Wireless Dongles Configured with Destination Addresses", filed Jan. 26, 2015, U.S. Appl. No. 14/606,011.

Paczkowski, Lyle W., et al., "Trusted Code Generation and Verification to Prevent Fraud from Maleficent External Devices that Capture Data", filed Jan. 14, 2015, U.S. Appl. No. 14/592,218.

Advisory Action dated Jun. 23, 2014, U.S. Appl. No. 13/571,348, filed Aug. 10, 2012.

Notice of Allowance dated Jun. 4, 2014, U.S. Appl. No. 13/557,213, filed Jul. 25, 2012.

FAIPP Pre-Interview Communication dated Aug. 4, 2014, U.S. Appl. No. 13/844,357, filed Mar. 15, 2013.

Notice of Allowance dated Jul. 8, 2014, U.S. Appl. No. 13/802,383, filed Mar. 13, 2013.

Restriction Requirement dated Aug. 14, 2014, U.S. Appl. No. 13/594,777, filed Aug. 25, 2012.

FAIPP Pre-Interview Communication dated Jul. 17, 2014, U.S. Appl. No. 13/594,778, filed Aug. 25, 2012.

FAIPP Pre-Interview Communication dated Jul. 17, 2014, U.S. Appl. No. 13/594,779, filed Aug. 25, 2012.

Office Action dated May 5, 2014, U.S. Appl. No. 13/786,450, filed Mar. 5, 2013.

(56) References Cited

OTHER PUBLICATIONS

FAIPP Pre-Interview Communication dated Aug. 6, 2014, U.S. Appl. No. 13/831,486, filed Mar. 14, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Foreign Communication from a Related Counterpart—International Search Report and Written Opinion, dated Jul. 11, 2014, PCT/US14/16651, filed on Feb. 16, 2014.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Notice of Allowance dated Nov. 29, 2013, U.S. Appl. No. 13/440,980, filed Apr. 5, 2012.
Office Action dated Dec. 19, 2013, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.

Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
FAIPP Pre-Interview Communication dated Jun. 6, 2013, U.S. Appl. No. 13/571,348, filed Aug. 10, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Cope, Warren B., et al.,"Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal ", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.

(56) References Cited

OTHER PUBLICATIONS

Bye, Stephen James, et al., "Systems and Methods for Provisioning and Using Multiple Trusted Security Zones on an Electronic Device", filed on Aug. 5, 2013, PCT Serial No. PCT/US13/53617.

Bye, Stephen James, et al., "Trusted Signaling in Long Term Evolution (LTE) 4G Wireless Communication", filed Feb. 7, 2013, U.S. Appl. No. 13/762,319.

Cope, Warren B., et al., "Extended Trusted Security Zone Radio Modem", filed Jul. 2, 2012, U.S. Appl. No. 13/540,437.

Katzer, Robin D., et al., "Trusted Access to Third Party Applications Systems and Methods", filed Jul. 25, 2012, U.S. Appl. No. 13/557,213.

Paczkowski, Lyle W., et al., "System and Methods for Trusted Internet Domain Networking", filed Sep. 11, 2012, U.S. Appl. No. 13/610,856.

Paczkowski, Lyle W., et al., "Trusted Security Zone Access to Peripheral Devices", filed Jul. 24, 2012, U.S. Appl. No. 13/556,200.

Paczkowski, Lyle W., et al., "Trusted Security Zone Access to Peripheral Devices", filed Jul. 24, 2013, PCT Application No. PCT/US13/51750.

Paczkowski, Lyle W., et al., Enablement of a Trusted Security Zone Authentication for Remote Mobile Device Management Systems and Methods, filed Mar. 15, 2013, U.S. Appl. No. 13/844,357.

Paczkowski, Lyle W., et al., "Trusted Security Zone Communication Addressing on an Electronic Device", filed Mar. 15, 2013, U.S. Appl. No. 13/844,145.

Bye, Stephen James, et al., "Protection for Multimedia Files Pre-Downloaded to a Mobile Device", filed Apr. 15, 2013, U.S. Appl. No. 13/863,376.

Paczkowski, Lyle W., et al., "Point-of-Sale and Automated Teller Machine Transactions Using Trusted Mobile Access Device", filed Mar. 13, 2013, U.S. Appl. No. 13/802,383.

Paczkowski, Lyle W., et al., "Trusted Security Zone Re-Provisioning and Re-Use Capability for Refurbished Mobile Devices", filed Mar. 14, 2013, U.S. Appl. No. 13/831,486.

Paczkowski, Lyle W., et al., "Trusted Security Zone Enhanced with Trusted Hardware Drivers", filed Mar. 13, 2013, U.S. Appl. No. 13/802,404.

Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.

Paczkowski, Lyle W., et al., "JTAG Fuse Vulnerability Determination and Protection Using a Trusted Execution Environment", filed Mar. 15, 2013, U.S. Appl. No. 13/844,325.

Paczkowski, Lyle W., et al., "Trusted Security Zone Containers for the Protection and Confidentiality of Trusted Service Manager Data", filed Mar. 14, 2013, U.S. Appl. No. 13/831,463.

Bye, Stephen James, et al., "Delivering Digital Content to a Mobile Device via a Digital Rights Clearing House", filed Apr. 10, 2013, U.S. Appl. No. 13/860,338.

Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.

Paczkowski, Lyle W., et al., "Mobile Access Terminal with Local Call Session Control Function", filed Jun. 18, 2009, U.S. Appl. No. 12/486,873.

Zimmerman, Ann, "Check Out the Future of Shopping", The Wall Street Journal, Business, May 18, 2011, http://online.wsj.com/article/SB10001424052748703421204576329253050634700.html.

Garry, Michael, Kroger Test Prepares for Mobile Future:, SN, Supermarket News, Jun. 13, 2011, http://supermarketnews.com/technology/kroger-test-prepares-mobile-future.

Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.

Office Action dated Aug. 29, 2014, U.S. Appl. No. 13/470,203, filed May 11, 2012.

Notice of Allowance dated Oct. 8, 2014, U.S. Appl. No. 13/294,177, filed Nov. 11, 2011.

FAIPP Pre-Interview Communication dated Sep. 25, 2014, U.S. Appl. No. 13/533,969, filed Jun. 27, 2012.

Notice of Allowance dated Oct. 6, 2014, U.S. Appl. No. 13/844,357, filed Mar. 15, 2013.

FAIPP Pre-Interview Communication dated Nov. 12, 2014, U.S. Appl. No. 13/844,145, filed Mar. 15, 2013.

Notice of Allowance dated Sep. 19, 2014, U.S. Appl. No. 13/594,778, filed Aug. 25, 2012.

Final Office Action dated Nov. 7, 2014, U.S. Appl. No. 13/786,450, filed Mar. 5, 2013.

Notice of Allowance dated Sep. 26, 2014, U.S. Appl. No. 13/831,486, filed Mar. 14, 2013.

FAIPP Pre-Interview Communication dated Nov. 7, 2014, U.S. Appl. No. 13/802,404, filed Mar. 13, 2013.

FAIPP Pre-Interview Communication dated Oct. 29, 2014, U.S. Appl. No. 13/844,282, filed Mar. 15, 2013.

FAIPP Pre-Interview Communication dated Oct. 21, 2014, U.S. Appl. No. 13/844,325, filed Mar. 15, 2013.

Foreign Communication from a Related Counterpart—International Preliminary Report on Patentability, dated Nov. 20, 2014, PCT/US13/40673, filed on May 10, 2013.

Perrig, Adrian, et al., "SPINS: Security Protocols for Sensor Networks," ACM, Sep. 2002, vol. 8, pp. 521-534.

Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp=&arnumber=5513119.

Lee, Jeremy, et al., "A Low-Cost Solution for Protecting IPs Against Scan-Based Side Channel Attacks," 24th IEEE VLSI Test Symposium. Pub. Date: 2006. http//ieeexplore. ieee. org/stamp/stamp.jsp?tp=&arnumber= 1617569.

Final Office Action dated Sep. 9, 2013, U.S. Appl. No. 13/440,980, filed Apr. 5, 2012.

Office Action dated Sep. 25, 2013, U.S. Appl. No. 13/571,348, filed Aug. 10, 2012.

Notice of Allowance dated Aug. 30, 2013; U.S. Appl. No. 13/540,437, filed Jul. 2, 2012.

Restriction Requirement dated Nov. 1, 2013, U.S. Appl. No. 13/557,213, filed Jul. 25, 2012.

Notice of Allowance dated Oct. 16, 2013, U.S. Appl. No. 13/556,200, filed Jul. 24, 2012.

Notice of Allowance dated May 27, 2014, U.S. Appl. No. 13/482,731, filed May 29, 2012.

Advisory Action dated May 29, 2014, U.S. Appl. No. 13/470,203, filed May 11, 2012.

FAIPP Pre-Interview Communication dated May 12, U.S. Appl. No. 13/294,177, filed Nov. 11, 2011.

Final Office Action dated Apr. 10, 2014, U.S. Appl. No. 13/571,348, filed Aug. 10, 2012.

FAIPP Pre-Interview Communication dated Apr. 3, 2014, U.S. Appl. No. 13/802,383, filed Mar. 13, 2013.

First Action Interview Office Action dated May 23, 2014, U.S. Appl. No. 13/802,383, filed Mar. 13, 2013.

Foreign Communication from a Related Counterpart—International Search Report and Written Opinion, dated Apr. 22, 2014, PCT/US13/53617, filed on Aug. 5, 2013.

FAIPP Pre-Interview Communication dated Mar. 25, 2015, U.S. Appl. No. 13/532,588, filed Jun. 25, 2012.

FAIPP Pre-Interview Communication dated Mar. 10, 2015, U.S. Appl. No. 13/762,319, filed Feb. 7, 2013.

FAIPP Pre-Interview Communication dated May 21, 2015, U.S. Appl. No. 14/090,667, filed Nov. 26, 2013.

Final Office Action dated Apr. 7, 2015, U.S. Appl. No. 13/844,145, filed Mar. 15, 2013.

First Action Interview Office Action dated Apr. 7, 2015, U.S. Appl. No. 13/802,404, filed Mar. 13, 2013.

FAIPP Pre-Interview Communication dated Mar. 26, 2015, U.S. Appl. No. 13/939,175, filed Jul. 10, 2013.

Final Office Action dated Mar. 24, 2015, U.S. Appl. No. 13/844,282, filed Mar. 15, 2013.

(56) References Cited

OTHER PUBLICATIONS

FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
Notice of Allowance dated Apr. 9, 2015, U.S. Appl. No. 14/163,047, filed Jan. 24, 2014.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.
Paczkowski, Lyle W., et al., "Trusted Code Generation and Verification to Prevent Fraud from Maleficent External Devices that Capture Data," filed Jan. 14, 2015, U.S. Appl. No. 14/596,218.
Notice of Allowance dated May 29, 2015, U.S. Appl. No. 14/085,474, filed Nov. 20, 2013.
FAIPP Pre-Interview Communication dated Jul. 2, 2015, U.S. Appl. No. 14/632,850, filed Feb. 26, 2015.
Notice of Allowance dated Jun. 17, 2015, U.S. Appl. No. 13/571,348, filed Aug. 10, 2012.
Notice of Allowance dated Jun. 9, 2015, U.S. Appl. No. 13/762,319, filed Feb. 7, 2013.
Notice of Allowance dated Aug. 4, 2015, U.S. Appl. No. 14/090,667, filed Nov. 26, 2013.
Notice of Allowance dated Jul. 6, 2015, U.S. Appl. No. 13/844,145, filed Mar. 15, 2013.
Notice of Allowance dated Jul. 6, 2015, U.S. Appl. No. 14/066,661, filed Oct. 29, 2013.
Notice of Allowance dated Aug. 14, 2015, U.S. Appl. No. 13/594,779, filed Aug. 25, 2012.
Final Office Action dated Aug. 27, 2015, U.S. Appl. No. 13/802,404, filed Mar. 13, 2013.
Notice of Allowance dated Jul. 7, 2015, U.S. Appl. No. 13/939,175, filed Jul. 10, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Jul. 1, 2015, U.S. Appl. No. 14/075,663, filed Nov. 8, 2013.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139, filed Apr. 4, 2013.
Notice of Allowance dated Jun. 11, 2015, U.S. Appl. No. 13/857,138, filed Apr. 4, 2013.
Henderson, Tristan, et al., "On the Wire, Congestion Pricing: Paying Your Way in Communications Networks," University College London, Sep./Oct. 2001, retrieved from: http://tristan.host.cs.st-andrews.ac.uklresearch/pubs/ieeeic01.pdf.

\* cited by examiner

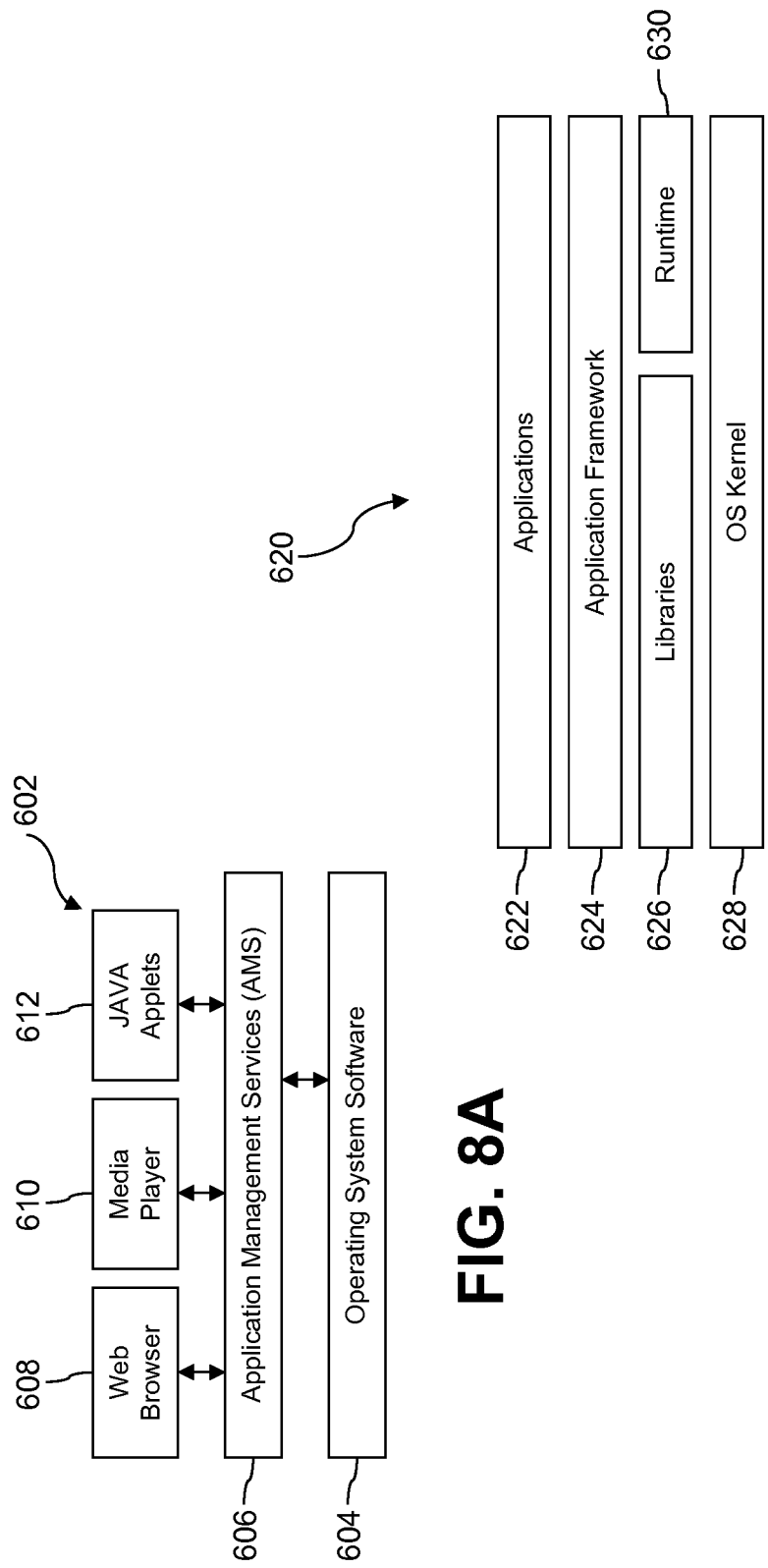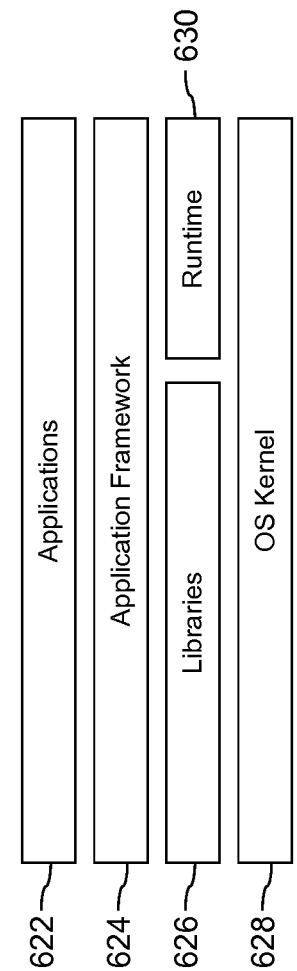

VERIFYING APPLICATIONS IN VIRTUAL ENVIRONMENTS USING A TRUSTED SECURITY ZONE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In an environment such as a virtual environment, various systems and/or applications on an electronic device or in a remote location may be authorized to access and/or transmit data to internal or external applications. Some of this data may be considered confidential data such as financial or health information, and there may be restrictions on the transmission of that confidential data.

SUMMARY

In an embodiment, a method of transmitting information between virtual environments is disclosed. The method comprises copying a first virtual environment, wherein the first virtual environment comprises a plurality of original applications, a first clock, and a first trusted security zone, wherein the first trusted security zone comprises a verification application and a nonce application, and subsequently, creating a second virtual environment, wherein the second virtual environment comprises a copy of at least some applications of the plurality of original applications, a second clock, and a second trusted security zone. The method further comprises receiving, by the verification application, from a copied application, a request for a transmission with an original application of the plurality of the original applications; determining, by the verification application, if a nonce associated with the copied application is a verified nonce, wherein the nonce comprises a clock value. Determining if the nonce is a verified nonce comprises comparing, by the verification application, the clock value of the nonce to a clock value of the first clock; and determining, by the first trusted security zone, if the clock value of the nonce correlates sufficiently to the clock value of the first clock. The method further comprises granting, in response to a determination that the clock value of the nonce correlates sufficiently to the clock value of the first clock, the request and denying, in response to a determination that the clock value of the nonce does not correlate sufficiently to the clock value of the first clock, the request.

In another embodiment, a method for transmitting data between applications in a virtual environment is disclosed. The method comprises receiving, by a first application in a first virtual environment, wherein the first virtual environment comprises a trusted security zone, a plurality of applications, and a clock, at least one of a request to send information to a second application or a request to receive information from the second application, wherein the second application comprises a nonce, and sending, by the first application, a request for verification of the second application to the trusted security zone in the first virtual environment, wherein the trusted security zone comprises a verification application. The method further comprises receiving, by the first application, from the verification application, a confirmation of verification, wherein the confirmation is sent based on: comparing, by the verification application, a nonce associated with the second application with an assigned nonce of a plurality of assigned nonces stored in the trusted security zone, wherein the nonce comprises a clock value; and determining, by the verification application, that the clock value correlates sufficiently to a current clock value on the clock in the first virtual environment.

In an embodiment, a system for transmitting information between applications is disclosed. The system comprises a first virtual environment, wherein the first virtual environment comprises a clock, a first application of a plurality of applications, and a trusted security zone; and wherein the trusted security zone comprises a verification application and a nonce application. The method further comprises a second application wherein the trusted security zone receives a request from the first application to verify the second application; wherein the application in the trusted security zone determines if a nonce associated with the second application is verifiable, wherein the determination is based on a comparison of a clock value of the nonce and a clock value of the clock; and wherein, in response to the determination that the clock value of the nonce correlates sufficiently to the clock value of the clock, the second application at least one of receives a transmission from the first application or sends a transmission to the first application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 8A is a block diagram of a software environment according to an embodiment of the present disclosure.

FIG. 8B is a block diagram of another software environment according to an embodiment of the present disclosure.

DETAILED DESCRIPTION

Figure 1:
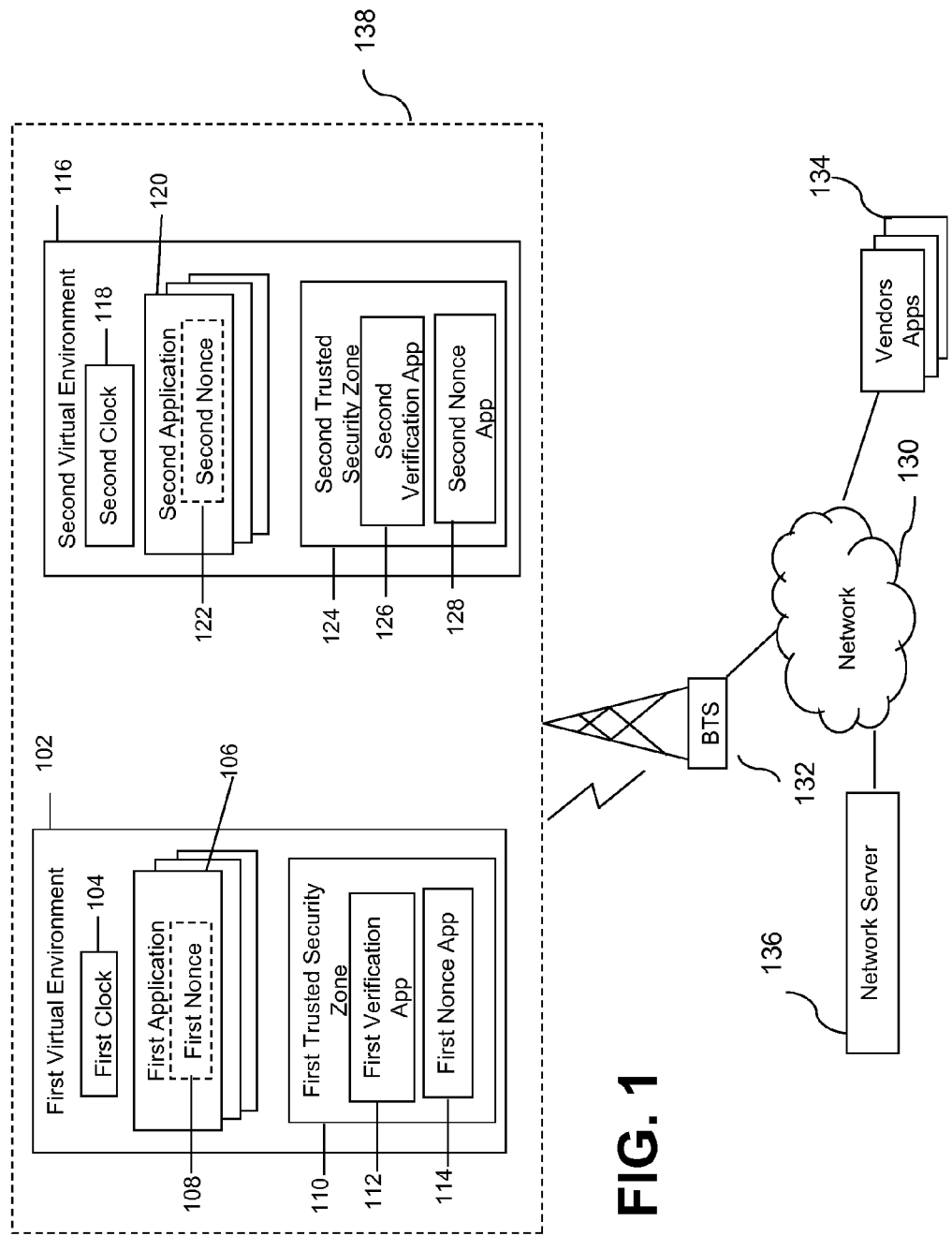
FIG. 1 is a block diagram of a system according to an embodiment of the present disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for generating and using a nonce in conjunction with a trusted security zone, which may also be referred to herein as a "trust zone." It is appreciated that a nonce, in some embodiments, may comprise one or more attributes or components and may be a unique, single-use identifier. In other embodiments, the nonce may be reusable, in whole or in part, for two or more uses. Accessing the trusted security zone may comprise one or more of the following: executing one or more secure applications in a trusted security zone of the mobile device; reading data from the trusted security zone portion of memory; writing data to the trusted security zone portion of memory; and accessing one or more keys in the trusted security zone. An application may be granted access to the trusted security zone. In some cases, a plurality of applications created and/or maintained by a telecommunications service provider or a third party such as a vendor may be granted access to communicate with or execute within the trusted security zone. Some applications may be referred to as trusted applications, which may mean that the applications are authorized to execute in the trusted security zone. Alternatively, applications referred to as authenticated applications may be authorized to communicate with the trusted security zone.

In some cases, one application may want to send information to or receive information from another application. For example, a first application may receive a request from a second application. This request may be for the second application to send information to the first application and/or for the first application to send information to the second application. However, the first application may not know if the second application is actually the second application (identify verification) or if the second application is a spoofed or otherwise corrupted or false source. This may be especially of interest if the information involved in the request is sensitive or confidential information such as financial data or health information. In addition, the first application may not know where the second application is hosted and/or is executing from, for example, whether the second application is executing on the same device as the first application, a different device than the first application, or on a remote server, in a cloned virtual environment, or in another location. Depending upon the embodiment, the first application and the second application may be in different virtual processing environments or may be in the same virtual processing environment. A virtual processing environment, as known to one skilled in the art, may be created by an operating system to provide applications executing in the virtual processing environment the appearance that they are executing on their own central processing unit. Typically a plurality of virtual processing environments—two or more—are created on a single central processing unit by an operating system; applications executing in a first one of the virtual processing environments feel as though their virtual processing environment is the complete central processing unit; and applications executing in a second one of the virtual processing environments feel as though their virtual processing environment is the complete central processing unit.

In one embodiment, a first application in a virtual environment receives a request from a second application. The virtual environment may comprise a trusted security zone, a clock, and a plurality of applications including the first and second applications. The request received by the first application may be for the first application to send information to the second application and/or for the first application to receive information from the second application. The first application may have been authorized to operate in and/or through a trusted security zone but may not know if the second application is a verified application from which it may receive information or to which it may send information. In that embodiment, the first application may want to verify that the second application is not spoofed. The first application may ask the trusted security zone to verify the second application. In an embodiment, the trusted security zone may comprise a verification application. The verification application may verify a nonce associated with and/or assigned to the second application. This may not mean that the second application would be authenticated or authorized to execute in or interact with the trusted security zone, just that the trusted security zone is the agent that verifies a nonce associated with and/or assigned to the second application so that the second application may interact with the first application. The first application may send a request to the trusted security zone to verify the second application, and the trusted security zone may then determine if the second application has a nonce assigned to and/or associated with it and if that nonce can be verified.

In an embodiment, the nonce is a unique identifier comprising at least one component that may be a number, letter, symbol, or combination thereof. In an embodiment, the nonce may comprise a time stamp that may indicate when the nonce was assigned, or may comprise a clock value that reflects the time of the virtual environment where the second application is located. The trusted security zone may also comprise a nonce application that assigns nonces to applications and that may store information such as the date, time, and other nonce components that were assigned to an application. A nonce may be assigned, for example, upon a first use/execution of an application that is in communication with or is executing in a trusted security zone. A nonce may also be assigned at the request of the verification application in response to receiving a request for verification from the first application.

If the verification application in the trusted security zone determines that the second application has a nonce assigned to it and/or associated with it, the verification application compares this nonce against information stored in the nonce application for the second application and/or stored in the trusted security zone portion of memory. The stored information may comprise a plurality of nonce components such as the date and time the nonce was assigned that should correspond to the time stamp, and/or the number, letter, symbol, or combination thereof that was assigned. If the stored information sufficiently correlates to the information from the second application, the trusted security zone may send a notification to the first application that the second application has been verified, at which time the requested transmission of information to/from the first application may commence. The nonce may comprise a clock value. In that case, the clock value is compared with the clock time in the virtual environment where the first application resides to look for a sufficient correlation. This is discussed in more detail in the embodiments below.

In combination with the present disclosure, one skilled in the art will readily be able to determine a clock value correlation threshold. In an embodiment, clock values that are within 1 second of each other may be sufficiently correlated. In another embodiment, clock values that are within 1 millisecond of each other may be sufficiently correlated. In another embodiment, clock values that are within 1 microsecond of each other may be sufficiently correlated. In general, a clock value correlation threshold may be determined such that the threshold is less than the clock skew that would typically be associated with cloning a second virtual execution environment along with the associated environment clock or environment clock value from a first virtual execution environment and first environment clock.

In an embodiment, the application requesting transmission of information, which in this is case the second application, may not have a nonce assigned. In that embodiment, a nonce may be assigned to the second application by the nonce application that is in communication with the verification application. Nonces may be assigned to applications when applications are first loaded into virtual environments, or may be assigned when the application attempts to communicate using the trusted security zone, or when the application attempts to execute in the trusted security zone. Applications may seek verification prior to transmission because the request for transmission of data was for sensitive, protected, or confidential data such as financial or healthcare data, or because the application does not want to receive a transmission of data from or send a transmission of data to an unknown source. In that embodiment, the verification application may commence verification after the nonce is assigned to the second application. In an alternate embodiment, if neither application has a nonce assigned to and/or associated with it, the verification application may request that the nonce application assign at least the application requesting transmission of information (the second application) a nonce. In some cases, the application requesting transmission of information may also have an assigned and/or associated nonce. This nonce assignment/association may depend on the type and/or sensitivity level of information requested for transmission. If the verification of the second application is successful, a notification may be sent from the trusted security zone to the first application, and then the first application may send/receive the information in the request for transmission from the second application. In an embodiment, while a nonce may be intended for single use verification, the first application may, based upon this verification, allow further transmissions to/from the second application. These further transmissions may be allowed for a predetermined period of time, for a predetermined number of messages, or combinations thereof.

If, in any of these embodiments, the verification of the nonce assigned to the second application fails, the verification application may notify the first application that the second application has not been verified. The first application may decide to re-attempt verification, may block the second application from further communication, or the trusted security zone may automatically re-attempt verification and may or may not send a notification indicating the re-attempt to the first application. The trusted security zone, for example by way of the verification application, may notify the first application that verification may be attempted again at a predetermined interval and/or that different or additional information may be requested.

In one embodiment, the first and the second applications may be in the same virtual environment. In an alternate embodiment, the first application and the second application are referred to as original applications and are in a virtual environment that may be referred to as a first or an original virtual environment. It is appreciated that, in some embodiments, the first environment may have been cloned from another environment. In another embodiment, this first virtual environment may be cloned to create a second virtual environment. The second virtual environment may comprise a copy of the plurality of original applications from the first virtual environment. This copied plurality of applications may include a copy of each the first application and the second application from the first virtual environment, as well as a trusted security zone, and a clock. In that embodiment, an application that resides in the cloned environment, which may be referred to as a copied application, may attempt to contact an application from the first virtual environment to request to send information to and/or receive information from an application in the first virtual environment such as the first application. In that embodiment, the first application in the first virtual environment may contact the trusted security zone in the first environment for verification of a nonce associated with the copied application in the second virtual environment. As discussed above, the verification application in conjunction with the nonce application determines if the copied application has a nonce. If the copied application does not have a nonce, the verification application in the first virtual environment may send a message to the first application requesting further instruction, providing options on how to proceed, or may send another request for additional information to the copied application.

If the copied application has a nonce, the verification application may verify the nonce in conjunction with the nonce application. This verification may comprise a comparison of a code assigned to the application and/or a clock value. If the nonce is determined to be a known nonce for the subject application, a further check of the clock value, which may or may not be part of the nonce, may be performed. The clock value may correspond to the clock value of the virtual environment where the second application currently executes. When the first virtual environment was cloned, the time it took to copy and clone the original virtual environment may mean that the clock value of the copied application may not correspond to the clock value in the first virtual environment. In that event, a notification may be sent to the first application that the copied application's verification failed. The first application may then block the copied application from contacting it again, re-attempt verification using the trusted security zone, and/or may send a notification to a telecommunications service provider regarding the failed verification and possible presence of a spoofed application. In an embodiment, the first application may take action to cause the copied application to obtain a nonce on its own behalf and the verification may be re-attempted.

In an alternate embodiment, when a second application requests service from a first application, the second application sends a request with a nonce to the first application, the first application asks the trusted security zone to confirm the nonce, and if the nonce is confirmed, service is provided to the second application.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, hand-held terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

FIG. 1 illustrates a system according to an embodiment of the present disclosure. In FIG. 1, a device 138 may be a portable electronic device or other computing device. The device 138 may comprise a plurality of virtual environments including a first virtual environment 102, which may also be referred to as the original environment 102, and a second virtual environment 116, which may also be referred to as the cloned environment 116. The system may also comprise a base transceiver station 132, a network server 136, a network 130, and a plurality of vendor applications 134. In an embodiment, the original environment 102 may comprise a first clock 104, a first plurality of applications 106, and a first trusted security zone 110. The first trusted security zone 110 may comprise a first verification application 112 and a first nonce application 114. The first nonce application 114 may assign nonces to applications and may keep a record of which nonce is assigned to which application. The first nonce application 114 may also store information such as the date and time at which a nonce was assigned to an application. The cloned environment 116 may comprise a second clock 118, a second plurality of applications 120 which may be referred to as the plurality of cloned applications 120, and a second trusted security zone 124. The first clock 104 and the second clock 118 as used herein refer to stored values that are updated and/or refreshed over time. The first clock 104 and the second clock 118 may be virtualized clocks that refer back to and are based on a hardware clock/component as opposed to a virtualized component. This hardware component may store a count of ticks or state changes over time. In an embodiment, each cloned application from the plurality of second applications 120 cloned from the first plurality of applications 106 may have a corresponding original application of the first plurality of applications 106. For example, application X in the first virtual environment 102 may have a corresponding cloned application X' in the second virtual environment 116.

At least some of the applications of the plurality of original applications 106 may be considered trusted or authenticated applications. A trusted application may be one that may execute in whole or in part in the trusted security zone 110, and an authenticated application may be one that may interact with the trusted security zone 110 but may not execute in the trusted security zone 110. In an embodiment, trusted and authenticated applications may have a first nonce 108 assigned to them by a first nonce application 114 that executes in the trusted security zone 110. The first nonce 108 may be a unique, single-use, identifier that may be requested by an original application or that may be assigned to the application automatically upon downloading from a trusted and/or otherwise authorized and/or authenticated source. The first nonce 108 is a randomly constructed string of characters and/or special characters that is deemed difficult to guess or discover by trial and error. The first nonce 108 may comprise a plurality of components or attributes. In an embodiment, one attribute or component of the first nonce 108 may be an identifier comprising at least one group of numbers, letters, symbols, or combinations thereof. In some embodiments where the first nonce 108 includes more than one component/attribute, the components/attributes may also be referred to as a level of protection. In another embodiment, the first nonce 108 may comprise a time stamp which may reflect the date and/or time that the first nonce 108 was assigned to an application. In a different embodiment, the time stamp of the first nonce 108 may comprise a clock value that reflects the clock value of the first clock 104 in the virtual environment when the first nonce 108 was assigned.

Figure 2:
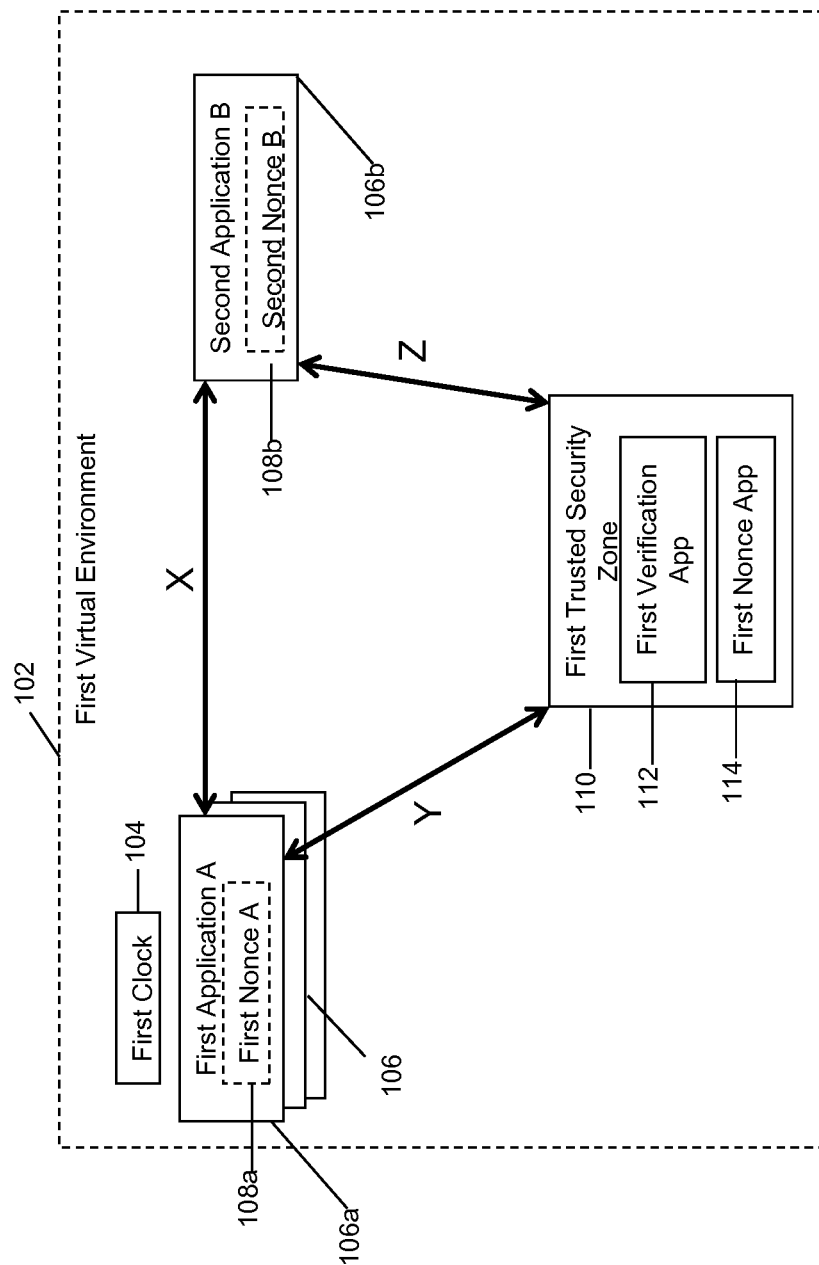
FIG. 2 illustrates an execution environment according to an embodiment of the present disclosure.
Figure 3:
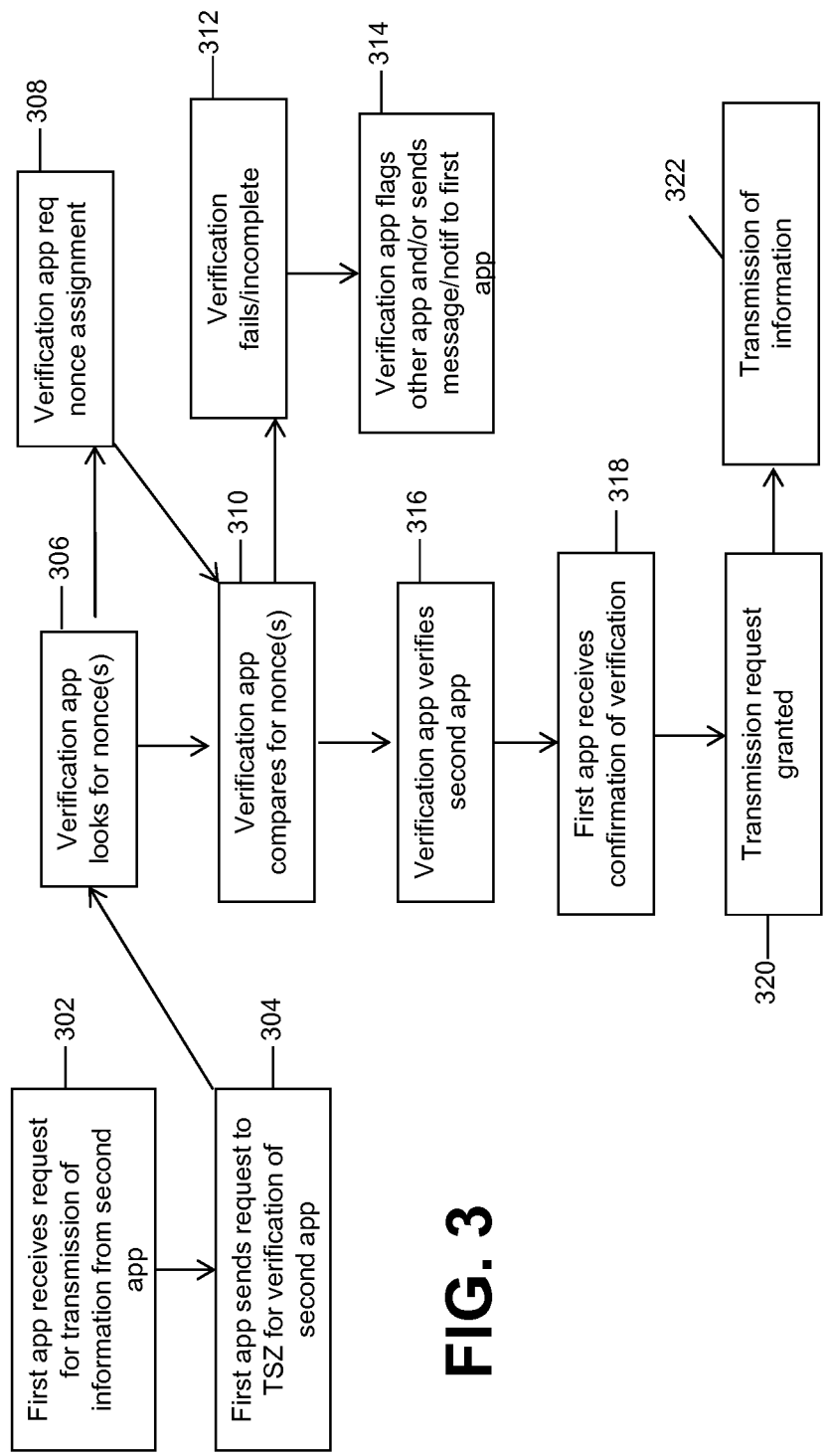
FIG. 3 is a flowchart of a method according to an embodiment of the present disclosure.

FIG. 2 illustrates an execution environment according to an embodiment of the present disclosure. FIG. 3 is a flowchart of a method according to an embodiment of the present disclosure. FIGS. 2 and 3 are discussed below. FIG. 2 shows similar features to the first environment 102 as shown in FIG. 1, including the first plurality of applications 106, the first clock 104, the first trusted security zone 110, the first verification application 112, and the first nonce application 114. FIG. 2 also illustrates a first application 106a of the first plurality of applications 106. The first application 106a that may comprise a first nonce 108a, and a second application 106b that may comprise a second nonce 108b.

At block 302 in FIG. 3, the first application 106a receives a request for a transmission from another application such as application B 106b. In some embodiments, the request at block 302 may contain a nonce, and in other embodiments, the first trusted security zone 110 may request a nonce from the requesting application as discussed below. This request for transmission may comprise at least one of a request to send information to or receive information from the second application 106b. In an embodiment, the first application 106a may be a trusted application or an authenticated application. When the second application 106b requests a transmission, the first application 106a may want to be able to verify that the second application 106b is not a spoofed application or otherwise an altered application.

At block 304, the first application 106a may send a request to the trusted security zone 110 to verify a second nonce 108b that may be assigned to and/or associated with the second application 106b. The verification may comprise a verification that the second application 106b is what it claims to be and/or is executing from a known, safe, or otherwise verifiable location. In an embodiment, the first application 106a may be a trusted or authenticated application that has had a first nonce 108a assigned to it prior to the request being sent to the first trusted security zone 110 at block 302. A nonce may be assigned when an application is loaded into an environment or when an application attempts to communicate with or execute in the first trusted security zone 110. At block 306, the first verification application 112, which may reside in the first trusted security zone 110, determines if there is a nonce associated with and/or assigned to the second application 106b. In some embodiments, at the request of the second application 106b or automatically based on predetermined settings, the first verification application 112 may also look for and/or request a nonce from the first application 106a.

In one embodiment, both the first application 106a and the second application 106b may be trusted or authenticated applications that have had first nonce 108a and second nonce 108b, respectively, assigned prior to the request being sent to the first trusted security zone 110 at block 304. In that embodiment, at block 316, the first verification application 112 may confirm, for example, in conjunction with the first nonce application 114, that the first nonce 108a and the second nonce 108b assigned to the first application 106a and the second application 106b correspond to the nonces recorded in the first nonce application 114 as being assigned to those respective applications. The verification at block 310 by the first verification application 112 may verify at least the second nonce 108b. The second nonce 108b may comprise a plurality of attributes and/or components, and at least one attribute and/or component of the plurality of attributes and/or components may be verified in this process. This attribute and/or component may include a combination of symbols, numbers, letters, or combinations thereof, and/or a time stamp and/or a clock value. In some embodiments, the second application 106b may request verification of the first application 106a which may proceed in a similar fashion to the verification for the second application 106b in FIG. 3.

In an embodiment, the time stamp of the second nonce 108b may be checked against the time stamp for the nonce assigned to the second application 106b that may be stored in the first nonce application 114. This time stamp may reflect when the second nonce 108b was assigned. In an alternate embodiment, the clock value may be checked against the value of the first clock 104 in the first virtual environment 102 where the first application 106a is located where the second application 106b is requesting to communicate with; this is discussed in more detail below with respect to FIGS. 4 and 5. It is appreciated that the nonce may comprise one more components and/or attributes and that at least one component and/or attribute may be verified at block 310.

If at block 310 the first verification application 112 successfully verifies the second nonce 108b associated with and/or assigned to second application 106b at block 316, the second application 106b may be considered verified. This may be based on the verification application 112 determining that the clock value of the nonce 108b corresponds and/or correlates sufficiently to the clock value of the first clock, which may in some embodiments mean an exact match and in other embodiments may mean a match close enough to determine that the clock value of the nonce 108b is not likely to reflect that of a different and/or unauthorized cloned environment. Determining whether the clock associated with the nonce 108b correlates sufficiently with the clock value of the first clock 104 may be based on comparing the difference between the two clock values and a clock value correlation threshold. If the difference is less than the correlation threshold, the two clock values are deemed sufficiently correlated. In combination with the present disclosure, one skilled in the art will readily be able to determine a clock value correlation threshold. In an embodiment, clock values that are within 1 second of each other may be sufficiently correlated. In another embodiment, clock values that are within 1 millisecond of each other may be sufficiently correlated. In another embodiment, clock values that are within 1 microsecond of each other may be sufficiently correlated. In general, a clock value correlation threshold may be determined such that the threshold is less than the clock skew that would typically be associated with cloning a second virtual execution environment along with the associated environment clock or environment clock value from a first virtual execution environment and first environment clock.

When the clock value of the nonce 108b correlates sufficiently to the clock value of the first clock, at block 318, the first application 106a may receive a confirmation of verification, and the transmission request sent at block 302 may be granted by the first application at block 320. The information requested by the second application 106b from the first application 106a and/or the information that the second application 106b requested to send to the first application 106a may be transmitted to the first application 106a at block 322.

If the verification at block 310 fails at block 312, the second application 106b may be asked by the verification application 112 to re-authenticate, may be denied communications/transmissions with the first application 106a, may be flagged by the first verification application 112 and/or the first nonce application 114 at block 314 as an application with which communication should not be allowed, or combinations thereof. It is appreciated that, in an embodiment, the nonces such as the first nonce 108a and the second nonce 108b assigned by the first nonce application 114 are each used only for a single use, a single communication/transmission, or series of related transmissions. In an embodiment, if an application other than 106b of the first plurality of applications 106 desires transmit information to and/or receive information from the first application 106a which has never interacted with that other application or for which a previous verification is no longer valid due to a predetermined time period, a number of transmissions, or a type of transmissions has expired or been exceeded. In that embodiment, a different nonce may be assigned to the other application 106b requesting transmission or receipt of information from the first application 106a and the method in FIG. 3 may be repeated. In an embodiment, the first verification application 112 may recognize that two applications have been previously authorized to communicate and may grant the requested communication/transmission on the basis of this previous communication based on the fact that the request at block 302 is within a predetermined time, number of transmissions, type of transmission, or combinations thereof.

In FIG. 2, the pathways X, Y, and Z may be further described as follows. Pathway X may be where the second application 106b requests to transmit information to and/or receive information from the first application 106a, for example, at block 302. Pathway X may also illustrate where, as discussed at block 322, the first application 106a receives/sends the information sent/requested by the second application 106b at block 302. In an embodiment, Pathway Y may indicate where, at block 304, the first application 106a requests verification of the second application 106b from the first trusted security zone 110, and where that verification (or failure of verification) is sent back. In some embodiments, if verification fails, a notification may be sent to the first application 106a that alerts the first application 106a of the failure and/or presents options for how to further proceed. In other embodiments, a message comprising options for how to further proceed may be sent instead of a notification of failure. This message may comprise options as re-attempt verification, report application, refuse all further attempts at communication from the second application 106b that failed verification may be sent instead of or in addition to the notification. Pathway Z may illustrate the transmission of a request for verification from the first trusted security zone 110 and/or first verification application 112 sent to the application requesting a transmission (the second application 106b). Pathway Z may also illustrate the transmission of the second nonce 108b (if present) from the second application 106b to the first trusted security zone 110 and/or first verification application 112.

Figure 4:
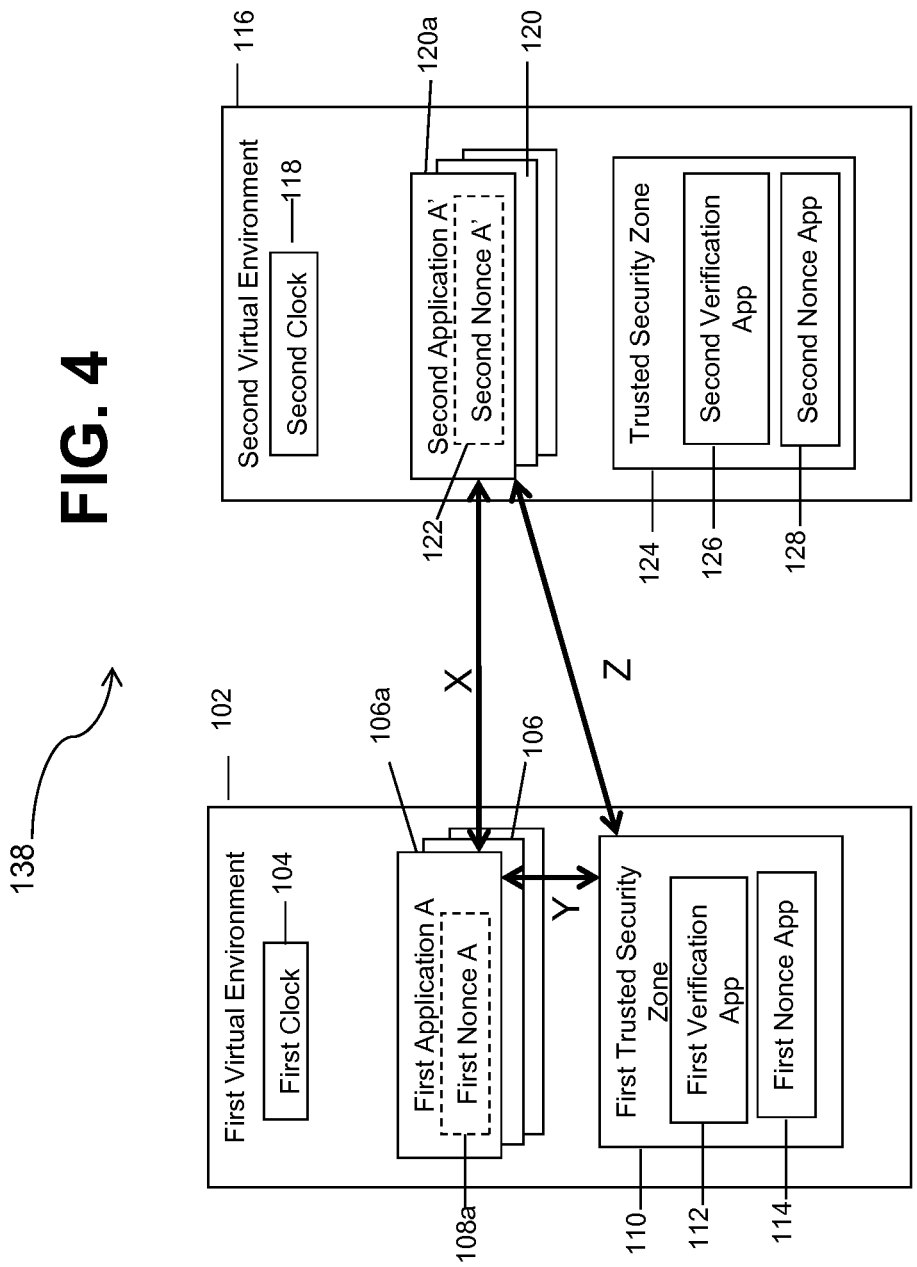
FIG. 4 is an illustration of two execution environments according to an embodiment of the present disclosure.

FIG. 4 illustrates two execution environments according to an embodiment of the present disclosure. FIG. 4 shows similar features in the first virtual environment 102 as shown in FIG. 1, including the first plurality of applications 106, the first application 106a is associated with the first nonce 108a, the first clock 104, the trusted security zone 110, the first verification application 112, and the first nonce application 114. FIG. 4 also shows second virtual environment 116 which, in some embodiments, is a cloned virtual environment of the first virtual environment 102. The second virtual environment 116 comprises a second clock 118, a second application A' 120a of a second plurality of applications 120 that may also be referred to as a copied or cloned application 120a or a second application 120a. In an embodiment, the second application 120a may comprise a nonce A' 122. This nonce A' 122 may be referred to as the second nonce 122 and, as discussed above, may comprise an identifier such as an alpha, symbol, numeric, or combinations thereof, and may comprise instead of or in addition to that identifier a time stamp reflecting when the nonce was assigned, when the environment was copied, or a clock value of the first clock 104.

Figure 5:
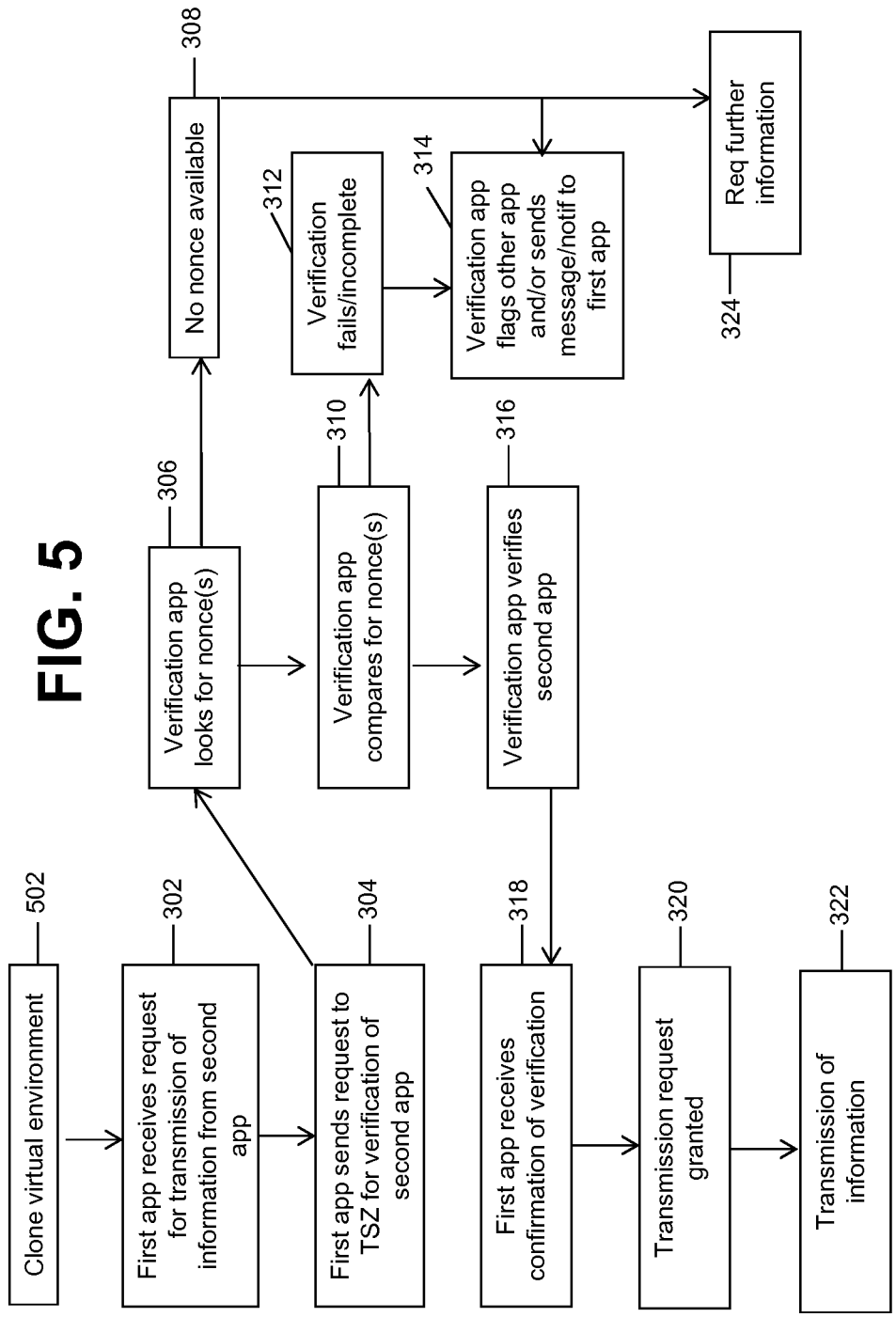
FIG. 5 is a flow chart of a method according to an embodiment of the present disclosure.

FIG. 5 is an illustration of a method according to an embodiment of the present disclosure. This method in FIG. 5 may proceed similarly as described with respect to FIG. 3 above, except that the first virtual environment 102 as shown in FIG. 4 is cloned at block 502. In an embodiment, the first application 106a in FIG. 4 may be a trusted or an authenticated application, and when the second application 120a requests information from or requests to send information to the first application 106a at block 302, the first application 106a may want to be able to verify that the second application A' 120a is not a spoofed or otherwise tampered-with or untrustworthy application. The first application 106a may want to verify that the second application 120a requesting transmission at block 302 is an application to which information can be safely sent to and safely received from without compromising the integrity of that information or of the device on which the first virtual environment 102 is located.

The first application 106a may send a request to the first trusted security zone 110 to verify the nonce associated with and/or assigned to second application at block 304. The verification at block 306 may comprise a verification that the second application A' 120a is what it claims to be. In an embodiment, the first application 106a may be a trusted or authenticated application that has had a first nonce 108a assigned to it prior to the request being sent to the first trusted security zone 110 at block 304. The first verification application 112 in the first trusted security zone 110 may receive the request sent at block 304 from the first application 106a. In one embodiment, both the first application 106a and the second application A' 120a may be trusted or authenticated applications that have had a first nonce 108a and a second nonce 122, respectively, assigned prior to the request being sent to the trusted security zone 110 and prior to the first virtual environment 102 being cloned at block 502. In that embodiment, at block 306, the first verification application 112 may verify that the nonces assigned to at least one of the first application 106a and the second application A' 120a corresponds to the nonces recorded and stored in the nonce application 114 as being assigned to each respective application. This verification at block 306 may comprise a verification of the first nonce 108a and the second nonce 122 which may comprise a plurality of attributes and/or components, and at least one attribute and/or component is verified in this process.

If the second nonce 122 comprises a time stamp, the time stamp may be checked against the time stamp for that application stored in the first nonce application 114, and this time stamp may reflect a clock value when the second nonce 122 was assigned. In an alternate embodiment, the time stamp may be a clock value that corresponds to the clock time in the environment where the second application A' 120a resides. The clock value of the nonce 122 may be checked against the clock value on the first clock 104 in the first virtual environment 102 where the first application 106a is located.

In one embodiment, the first verification application 112 "asks" the second application A' 120a for the time. If the current time associated with the second nonce 122 of the second application A' 120a does not correlate sufficiently to the clock value of the first clock 104 in the first virtual environment 102, the transmission request may be denied at block 312. In one example, the verification at block 306 may fail because the clock associated with the second nonce 122 of the second application A' 120a may not correlate closely to the current clock value on the first clock 104. This difference may be due to the time difference created when the environment 102 is cloned/copied, and may be used to indicate a spoofed or otherwise undesirable application. It is appreciated that at least the first clock 104 and any related copies may keep time down to units of measurement as small as may be needed to detect cloned, spoofed, or otherwise potentially untrustworthy applications.

Determining whether the clock associated with the second nonce 122 correlates sufficiently with the clock value of the first clock 104 may be based on comparing the difference between the two clock values and a clock value correlation threshold. If the difference is less than the correlation threshold, the two clock values are deemed sufficiently correlated. In combination with the present disclosure, one skilled in the art will readily be able to determine a clock value correlation threshold. In an embodiment, clock values that are within 1 second of each other may be sufficiently correlated. In another embodiment, clock values that are within 1 millisecond of each other may be sufficiently correlated. In another embodiment, clock values that are within 1 microsecond of each other may be sufficiently correlated. In general, a clock value correlation threshold may be determined such that the threshold is less than the clock skew that would typically be associated with cloning a second virtual execution environment along with the associated environment clock or environment clock value from a first virtual execution environment and first environment clock.

If the first verification application 112 at block 306 successfully verifies the first nonce 108a and/or the second nonce 122 at block 316, the request at 302 may be granted at block 320, after the first application 106a receives confirmation of verification at block 318. The information requested from the first application 106a and/or the information that the second application A' 120a requested to send at block 302 may then be transmitted at block 322. In an alternate embodiment, if the application requesting transmission of information, in this case the second application A' 120a, is not a trusted or authenticated application and therefore may not have a nonce, the first verification application 112 at block 308 may interpret this as a failed verification similar to block 312 and/or may require further steps for verification at block 324.

If the second application A' 120a has a second nonce 122, but the verification at 306 fails, the second application 120a may be asked to re-authenticate. Instead of, or in addition to this re-authentication, a message may be sent to the first application 106a at block 314 that the verification failed at block 312, and the second application A' 120a may be denied communications with the first application 106a. In alternate embodiments, the second application A' 120a may be flagged at block 314 by the first verification application 112 and/or the first nonce application 114 as an application with which communication may not be allowed. It is appreciated that the nonces assigned by the nonce application 114 may be for only a single use, a single communication/transmission, or a series of related transmissions. If an application of the first plurality of applications 106 and an application of the second plurality of applications 120 wish to communicate or transmit information after the initial transmission at 322, a different nonce may be assigned to at least the application requesting transmission or receipt of information (the second application A' 120a in this example) and the method in FIG. 5 may be repeated. In an embodiment, the first verification application 112 may recognize that two applications have been previously authorized to communicate and may grant the requested communication/transmission on the basis of this previous communication.

FIG. 4 also illustrates three communication pathways, X, Y, and Z. In an embodiment, pathway X may be where a request is sent for example at block 302 in FIG. 5 by the second application 120a in the cloned (second virtual) environment 116 to the first application 106a in the original (first virtual) environment 102. Pathway X may also indicate the activity resulting from the verification at block 312. This activity may include a transmission at block 322 if the verification is successful, or a notification and/or message may be sent at block 314 that the verification failed at block 312. In an embodiment, this notification and/or message may be sent after the first application 106a is notified at block 314 of the verification failure at block 312. Pathway Y may be where the request for verification is sent at block 304 from the first application 106a to the first trusted security zone 110. Pathway Y may also indicate where a message and/or notification is sent to the first application 106a from the first verification application 112 if the verification fails at block 312. Pathway Z is illustrated to show where the first verification application 112 looks for the second nonce 122 in the second application A' 120a and where further information may be requested by the trusted security zone 110 and applications in the trusted security zone from the second application 120a.

Figure 6:
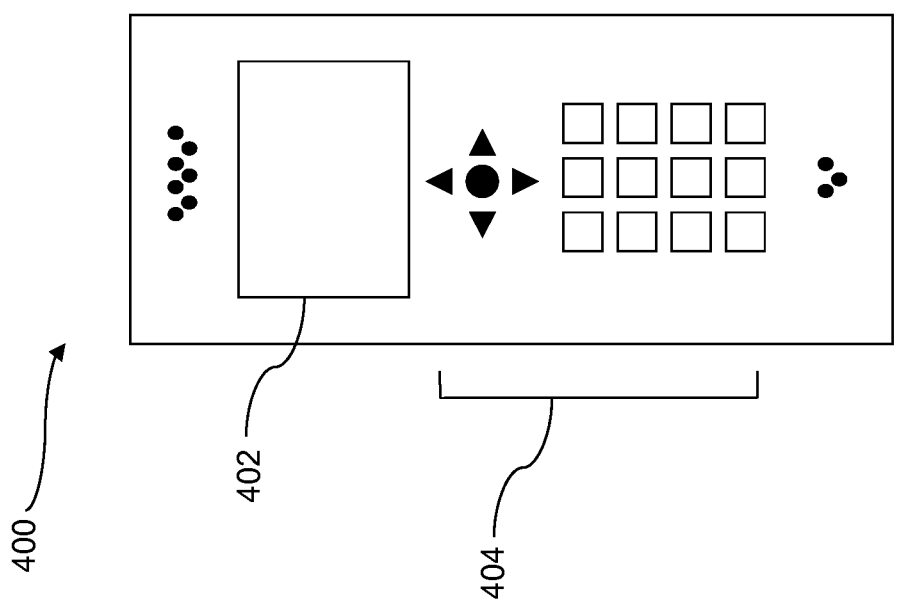
FIG. 6 depicts a mobile device according to an embodiment of the present disclosure.

FIG. 6 depicts the mobile device 400, which is operable for implementing aspects of the present disclosure, but the present disclosure should not be limited to these implementations. The mobile device 400 may, for example, comprise the virtual environment 102 from FIG. 2 and/or the cloned environment 116 from FIG. 4. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 7:
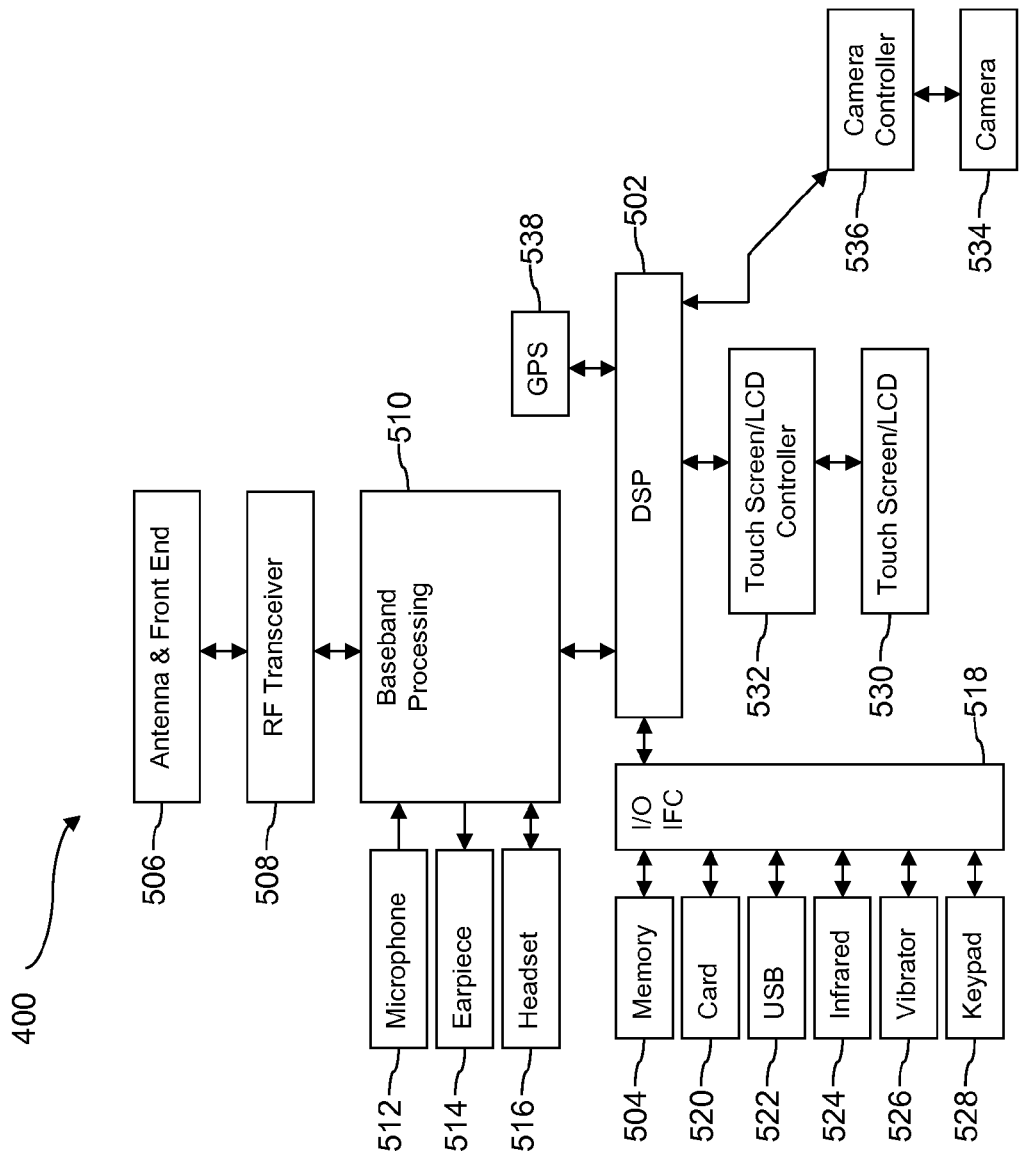
FIG. 7 is a block diagram of a mobile device according to an embodiment of the present disclosure.

FIG. 7 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
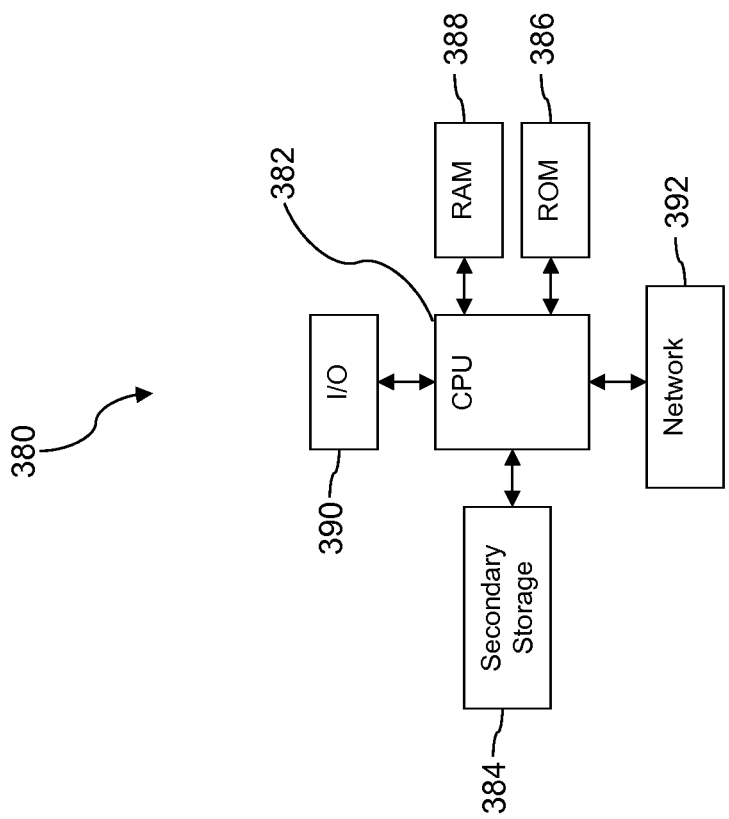
FIG. 9 is a block diagram of a computer system according to an embodiment of the present disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of transmitting information between virtual environments comprising:
    copying a first virtual environment, wherein the first virtual environment comprises a plurality of original applications, a first clock, and a first trusted security zone, wherein the first trusted security zone comprises a verification application and a nonce application;
    subsequently, creating a second virtual environment, wherein the second virtual environment comprises a copy of at least some applications of the plurality of original applications, a second clock, and a second trusted security zone;
    receiving, by the verification application residing in the first trusted security zone, from a copied application, a request for a transmission with an original application of the plurality of the original applications;
    determining, by the verification application residing in the first trusted security zone, if a nonce associated with the copied application is a verified nonce, wherein the nonce comprises a clock value of the second clock and a time stamp, and wherein determining if the nonce is a verified nonce comprises:
        comparing, by the verification application residing in the first trusted security zone, at least the clock value of the nonce to a clock value of the first clock; and
        determining, by the first trusted security zone, if the clock value of the nonce correlates sufficiently to the clock value of the first clock; and
    at least one of:
        granting, in response to a determination that the clock value of the nonce correlates sufficiently to the clock value of the first clock, the request, and sending the requested transmission from the first trusted security zone to the second trusted security zone; or
        denying, in response to a determination that the clock value of the nonce does not correlate sufficiently to the clock value of the first clock, the request.

2. The method of claim 1, wherein the nonce further comprises a unique alpha, numeric, symbol, or combination identifier.

3. The method of claim 1, wherein the nonce associated with the copied application is a verified nonce if at least one of the clock value and the time stamp are verified.

4. The method of claim 1, further comprising comparing, by the nonce application, the time stamp to a time the nonce was assigned, wherein the nonce application comprises stored data, wherein the stored data comprises a plurality of information about nonces including the time the nonce was assigned.

5. The method of claim 1, wherein the time stamp of each copied application is a time when the nonce was assigned to each application.

6. The method of claim 1, wherein the clock value of the nonce is the current time in the second virtual environment.

7. The method of claim 1, wherein the request for transmission is for at least one of to transmit information to the original application or receive information from the original application.

8. The method of claim 1, wherein the copied application is not requesting access to its corresponding original application in the first virtual environment.

9. A method for transmitting data between applications in a virtual environment comprising:
- receiving, by a first application in a first virtual environment, at least one of a request to send information to a second application or a request to receive information from the second application, wherein the first virtual environment comprises a trusted security zone, a plurality of applications, and a clock, and wherein the second application comprises a nonce;
- sending, by the first application, a request for verification of the second application to the trusted security zone in the first virtual environment, wherein the trusted security zone comprises a verification application; and
- receiving, by the first application, from the verification application, a confirmation of verification of the second application, wherein the confirmation is sent based on:
  - comparing, by the verification application, a nonce associated with the second application with an assigned nonce of a plurality of assigned nonces stored in the trusted security zone, wherein the nonce comprises a clock value and a time stamp;
  - comparing the time stamp to a time the nonce was assigned, wherein the nonce application comprises stored data, wherein the stored data comprises a plurality of information about nonces including the time the nonce was assigned; and
  - determining, by the verification application, that the clock value correlates sufficiently to a current clock value on the clock in the first virtual environment.

10. The method of claim 9, wherein the second application is in a second virtual environment.

11. The method of claim 10, wherein the second application is a copy of an application of the plurality of applications in the first virtual environment.

12. The method of claim 9, wherein each assigned nonce of the plurality of the assigned nonces corresponds to a nonce assigned to an application.

13. The method of claim 9, further comprising at least one of sending the information to or receiving the information from the second application in response to receiving the confirmation.

14. The method of claim 9, wherein a plurality of records associated with the plurality of assigned nonces is stored in a nonce application in the trusted security zone.

15. A system for transmitting information between applications comprising:
- a first virtual environment stored in a non-transitory memory of a computing device,
  - wherein the first virtual environment comprises a clock, a first application of a plurality of applications, and a trusted security zone;
  - wherein the trusted security zone comprises a verification application and a nonce application;
- a second application stored in a non-transitory memory,
  - wherein the trusted security zone receives a request from the first application to verify the second application;
  - wherein the first application resides in the trusted security zone and verifies that a nonce that comprises a clock value and a time stamp and is associated with the second application is verifiable based at least on a comparison of the clock value of the nonce and a clock value of the clock; and
  - wherein the second application, in response to the verification that the clock value of the nonce correlates sufficiently to the clock value of the clock, at least one of receives a transmission from the first application or sends a transmission to the first application.

16. The system of claim 15, wherein the first application sends the request to the trusted security zone in response to receiving a request from the second application to at least one of send information to the second application or receive information from the second application.

17. The system of claim 15, further comprising a second virtual environment, wherein the second application is a copy of an application of the plurality of applications of the first virtual environment, and wherein the second application is in the second virtual environment.

18. The method of claim 15, wherein the nonce comprises a unique alpha, numeric, symbol, or combination identifier, and a clock value.

* * * * *